(12) United States Patent
Mobarrez et al.

(10) Patent No.: US 12,283,892 B2
(45) Date of Patent: Apr. 22, 2025

(54) LOW LOSS POWER CONVERTER CONTROL

(71) Applicant: Rivian IP Holdings, LLC, Irvine, CA (US)

(72) Inventors: Maziar Mobarrez, Irvine, CA (US); Shenli Zou, Redondo Beach, CA (US); Lixiang Wei, Irvine, CA (US); Chanaka Manoj Singhabahu, College Park, MD (US)

(73) Assignee: Rivian IP Holdings, LLC, Irvine, CA (US)

( * ) Notice: Subject to any disclaimer, the term of this patent is extended or adjusted under 35 U.S.C. 154(b) by 545 days.

(21) Appl. No.: 17/701,526

(22) Filed: Mar. 22, 2022

(65) Prior Publication Data

US 2023/0318467 A1 Oct. 5, 2023

(51) Int. Cl.
*H02M 3/335* (2006.01)
*B60L 53/22* (2019.01)
*B60L 53/62* (2019.01)
*H02J 7/00* (2006.01)
*H02M 1/00* (2006.01)

(52) U.S. Cl.
CPC ......... *H02M 3/33573* (2021.05); *B60L 53/22* (2019.02); *B60L 53/62* (2019.02); *H02J 7/00712* (2020.01); *H02M 1/0058* (2021.05); *H02M 3/33576* (2013.01)

(58) Field of Classification Search
CPC ........... H02M 3/33573; H02M 1/0058; H02M 3/33576; H02M 1/32; H02M 1/36; H02M 3/33584; H02M 1/083; H02M 1/088; H02M 3/3353; B60L 53/22; B60L 53/62; B60L 2210/10; B60L 2270/20; B60L 53/00; H02J 7/00712
USPC ...................................................... 320/163
See application file for complete search history.

(56) References Cited

U.S. PATENT DOCUMENTS

| | | | |
|---|---|---|---|
| 2011/0249472 A1 | 10/2011 | Jain et al. | |
| 2012/0068663 A1* | 3/2012 | Tanikawa | B60L 53/22 320/137 |
| 2021/0155100 A1 | 5/2021 | Khaligh et al. | |

OTHER PUBLICATIONS

U.S. Appl. No. 63/239,962, filed Sep. 2, 2021. (Copy not attached).
(Continued)

*Primary Examiner* — Paul Dinh
(74) *Attorney, Agent, or Firm* — Foley & Lardner LLP

(57) ABSTRACT

A voltage output circuit and methods for operating voltage output circuits are disclosed. In some embodiments, a voltage output circuit comprises a power converter and a power converter controller, and is configured to provide a desired output voltage for charging an output. In some embodiments, the power converter comprises a first transistor and a second transistor. By using the power converter controller to control the power converter, a current through the first transistor may be increased until it reaches a value corresponding to the desired output voltage. When the value is reached, the first transistor may be turned off to cause a drain-to-source voltage of the second transistor to become zero. When the drain-to-source voltage of the second transistor becomes zero, the second transistor turns on, and an output of the power converter is charged to the desired output voltage.

20 Claims, 12 Drawing Sheets

(56) References Cited

OTHER PUBLICATIONS

Zou, S., et al. (Jan. 3, 2020). "Modelling and control of a triple-active-bridge converter", The Institution of Engineering and Technology, IET Power Electronics., 2020, vol. 13 Iss. 5, pp. 961-969.
Bhattacharjee et al., "Analytical Solution For Minimum RMS Current and Reactive Power Modulation of A Soft Switched Dual Active Bridge Converter", 2019 IEEE Energy Conversion Congress and Exposition (ECCE), 2019, 1321-1327.
Li et al., Global Optimization for Dual Active Bridge Converters to Minimize RMS Current, 2020 IEEE Energy Conversion Congress and Exposition (ECCE), 2020, 5648-5655.
Office Action on DE Appl. No 102022130991.6 dated Jan. 31, 2025, with machine translation (9 pages).

* cited by examiner

LOW LOSS POWER CONVERTER CONTROL

INTRODUCTION

In the applications where an output of the power converter (e.g., a DC-DC converter) is configured to connect to a device or system receiving the output energy, it may be desirable to precharge an output capacitor to provide the energy to the device or system. Precharging may protect circuit components of the device or system by limiting the inrush current at the time of the connection. For example, the power converter may be providing energy to charge an electric vehicle, and it may be desirable to protect the vehicle's charging circuitry from the inrush current. Further, it may be desirable to achieve zero voltage switching (ZVS) turn on of the converter (e.g., a dual active bridge (DAB) converter with small transformer primary and secondary currents) without additional auxiliary components in the power converter circuit.

BRIEF SUMMARY

A voltage output circuit and methods for operating voltage output circuits are disclosed. In some embodiments, a voltage output circuit comprises a power converter and a power converter controller, and is configured to provide a desired output voltage for charging an output. In some embodiments, the power converter comprises a first transistor and a second transistor. By using the power converter controller to control the power converter, a current through the first transistor may be increased until it reaches a value corresponding to the desired output voltage. When the value is reached, the first transistor may be turned off (e.g., by the power converter controller) to cause a drain-to-source voltage of the second transistor to become zero. When the drain-to-source voltage of the second transistor becomes zero, the second transistor turns on (e.g., by the power converter controller to achieve ZVS), and an output of the power converter is charged to the desired output voltage.

The embodiments disclosed above are examples, and the scope of this disclosure is not limited to them. Particular embodiments may include all, some, or none of the components, elements, features, functions, operations, or steps of the embodiments disclosed above. Embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

A voltage output circuit and methods for operating voltage output circuits are disclosed. In some embodiments, a voltage output circuit comprises a power converter and a power converter controller, and is configured to provide a desired output voltage for charging an output. In some embodiments, the power converter comprises a first transistor (e.g., transistor Q6 during a first phase of power conversion, transistor Q5 during a second phase of power conversion) and a second transistor (e.g., transistor Q5 during a first phase of power conversion, transistor Q6 during a second phase power conversion). By using the power converter controller to control the power converter, a current through the first transistor may be increased until it reaches a value corresponding to the desired output voltage (e.g., for charging the precharge capacitor). When the value is reached, the first transistor may be turned off (e.g., by the power converter controller) to cause a drain-to-source voltage of the second transistor to become zero. When the drain-to-source voltage of the second transistor becomes zero, the second transistor turns on (e.g., by the power converter controller to achieve ZVS), and an output of the power converter is charged to the desired output voltage.

In some embodiments, it may be desirable to precharge an output capacitor to provide protect circuit components of the device or system by limiting the inrush current at the time of the connection. For example, the power converter may be providing energy to charge an electric vehicle, and it may be desirable to protect the vehicle's charging circuitry from the inrush current. The disclosed circuits and methods allow a sufficient amount of transformer primary and secondary currents in the power converter to achieve ZVS turn on of the converter devices to reduce switching power loss and increase power conversion efficiency (e.g., an amount of conduction power consumed for achieving ZVS is less than switching power loss without ZVS), while allowing an output capacitor to be precharged to protect a load connected to the power converter.

Figure 1:
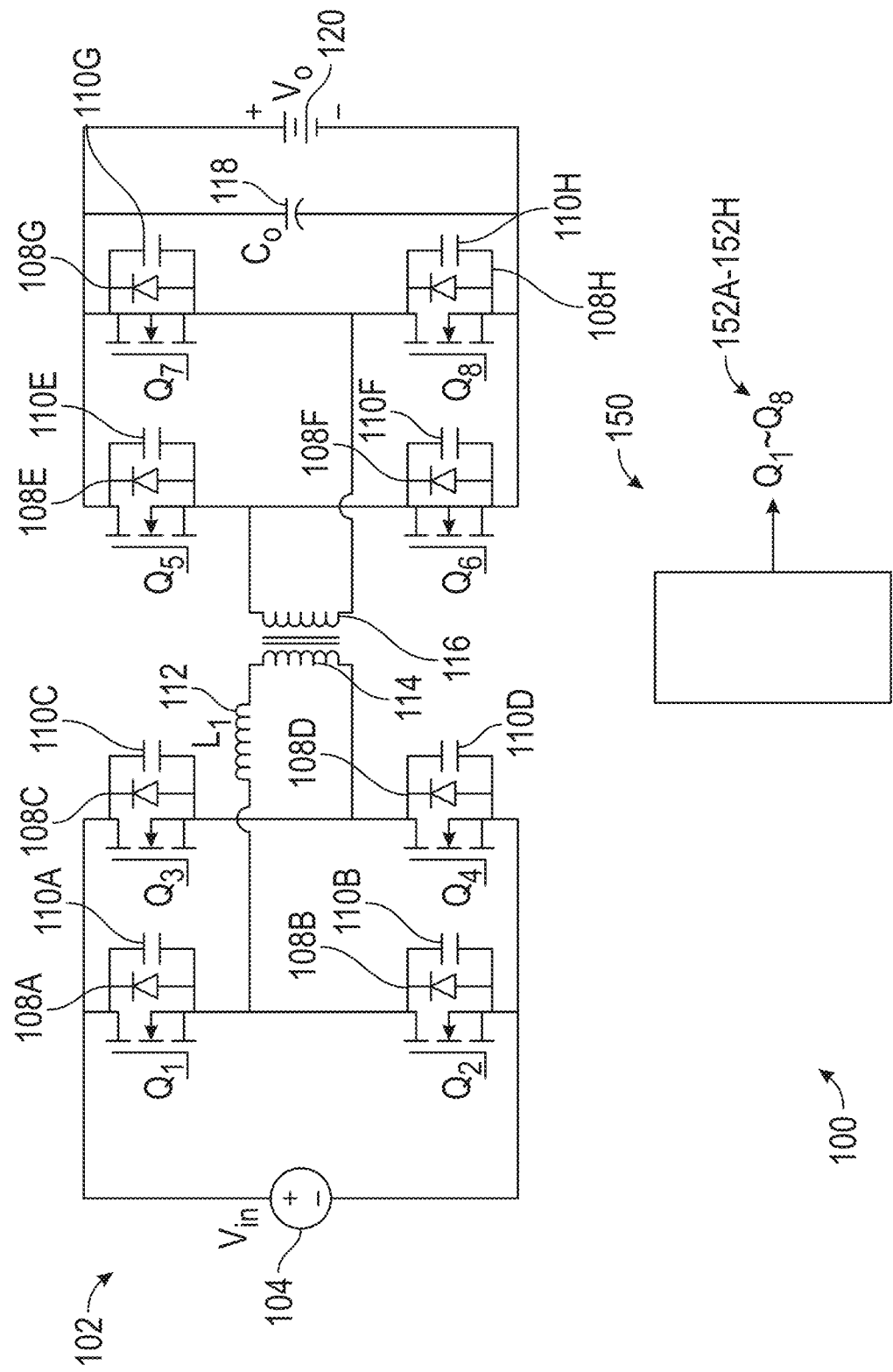
FIG. 1 illustrates an example voltage output circuit schematic.

FIG. 1 illustrates an example voltage output circuit schematic. FIG. 1 shows a voltage output circuit 100, which comprises power converter 102 and power converter controller 150. In some embodiments, the power converter 102 is a DC-DC converter. For example, the power converter 102 is a dual active bridge converter, as illustrated. Although examples of low loss power converter control are described with respect to a dual active bridge converter, it is understood that the examples are not meant to be limiting. It is appreciated that the disclosed circuit operations may be used for other converter circuits.

In some embodiments, the power converter 102 is configured to receive an input voltage source 104 and provide an output voltage (e.g., a desired output voltage) across the output load 120. In some embodiments, the power converter 102 is configured to receive an input voltage between 400 V and 900 V. It is appreciated that the power converter 102 may be configured for a lower input voltage or a higher input voltage. In some embodiments, the power converter 102 is configured to provide an output voltage between 200 V and 1000 V. It is appreciated that the power converter 102 may be configured for a lower output voltage or a higher input voltage. In some embodiments, the voltage is provided to the output load 120 via precharge capacitor 118. The power converter 102 is configured to precharge the precharge capacitor 118 to a desired output voltage, and the precharge capacitor 118 provides the desired output voltage to the output load 120. By providing the desired output voltage to the output load 120 via the precharge capacitor 118, the output load 120 may be protected from inrush currents from other parts of the power converter. In some embodiments, the power converter 102 may not comprise precharge capacitor 118, and an output voltage is directly provided to the output load 120.

In some embodiments, the output load 120 comprises a battery of an electric vehicle. The examples disclosed herein advantageously allow a sufficient amount of currents in the power converter to achieve ZVS turn on of the converter devices to reduce switching power loss and increase power conversion efficiency (e.g., an amount of conduction power consumed for achieving ZVS is less than switching power loss without ZVS), while allowing an output capacitor to be precharged to protect the charging circuitry of the electric vehicle. The examples disclosed herein allow the power converter 102 to be operated in a low loss manner without additional auxiliary components such as NTC resistors and/or relays, which would increase the cost and complexity of the power converter circuit.

In some embodiments, as illustrated, the voltage output circuit 100 comprises transistors Q1-Q8. The transistors Q1-Q8 may be power semiconductor devices. These transistors Q1-Q8 comprise effective drain-to-source capacitances 110A-110H, respectively. Although NMOS transistors are described with respect to this example, it is understood that PMOS transistors may be used for power conversion. It is appreciated that Q1-Q8 may be non-MOSFET devices. In some embodiments, Q1-Q8 are insulated-gate bipolar transistors (IGBT) or Gallium Nitride (GaN) devices. In some embodiments, the voltage converter circuit 100 comprises diodes 108A-108H connected in parallel to the transistors Q1-Q8. The cathode terminals of the diodes are connected to a respective drain terminal of a transistor, and the anode terminals of the diodes are connected to a respective source terminal of a transistor. In some embodiments, the diodes are configured to limit current flow in one direction (e.g., from the anode to the cathode) across a respective transistor when the transistor is off (e.g., non-conducting, the gate-to-source voltage of the transistor is below the transistor's threshold voltage).

In some embodiments, the transistors Q1-Q8 are controlled by power converter controller 150. For example, outputs of the power converter controller 150 connect to the source terminals of Q1-Q8 for turning on (e.g., by providing a gate-to-source voltage above a transistor's threshold voltage) and turning off (e.g., by ceasing providing a gate-to-source voltage above a transistor's threshold voltage) each transistor. In some embodiments, the power converter controller 150 is configured to receive the parameters $\varphi_1$, $\varphi_2$, $\delta_1$, and $\delta_2$, and the power converter controller 150 is configured to generate the signals for switching the transistors Q1-Q8 based on the determination of these parameters.

Although some example circuit operations herein are described to be performed at specific times, it is appreciated that similar operations performed on an actual circuit may not be performed exactly at the specific times. For example, due to e.g., circuit delays, PVT (process, voltage, temperature) variations, circuit mismatches, an operation on an actual circuit may be performed at a time within a tolerance from a specific time, such that the benefits described herein are achieved by the actual circuit.

In some embodiments, the power converter 102 comprises shim inductor 112, primary inductor 114, and secondary inductor 116. In some embodiments, $\varphi_1$ represents a phase of a voltage across the primary inductor 114 (e.g., a time of a middle of a pulse $V_{pri}$, as described with respect to FIGS. 3A-3H), 2 represents a phase of a voltage across the secondary inductor 116 (e.g., a time of a middle of a pulse $V_{sec}$ from $\varphi_1$, as described with respect to FIGS. 3A-3H), $\delta_1$ represents an inner phase shift of the voltage across the primary inductor 114 (e.g., $2\delta_1$ is a timing difference between positive $V_{pri}$ and negative $V_{pri}$ pulses, as described with respect to FIGS. 3A-3H), and $\delta_2$ is represents an inner phase shift of the voltage across the primary inductor 114 (e.g., $2\delta_1$ is a timing difference between positive $V_{pri}$ and negative $V_{pri}$ pulses, as described with respect to FIGS. 3A-3H). These parameters may be determined based on a requirement (e.g., minimizing conduction loss while achieving ZVS turn on and providing a desired output voltage) of the power converter circuit 102. Examples for determining these parameters and the timing for switching transistors Q1-Q8 are disclosed in more detail below. Exemplary operations of the voltage output circuit 100 are described with respect to FIGS. 3A-3D.

Figure 2:
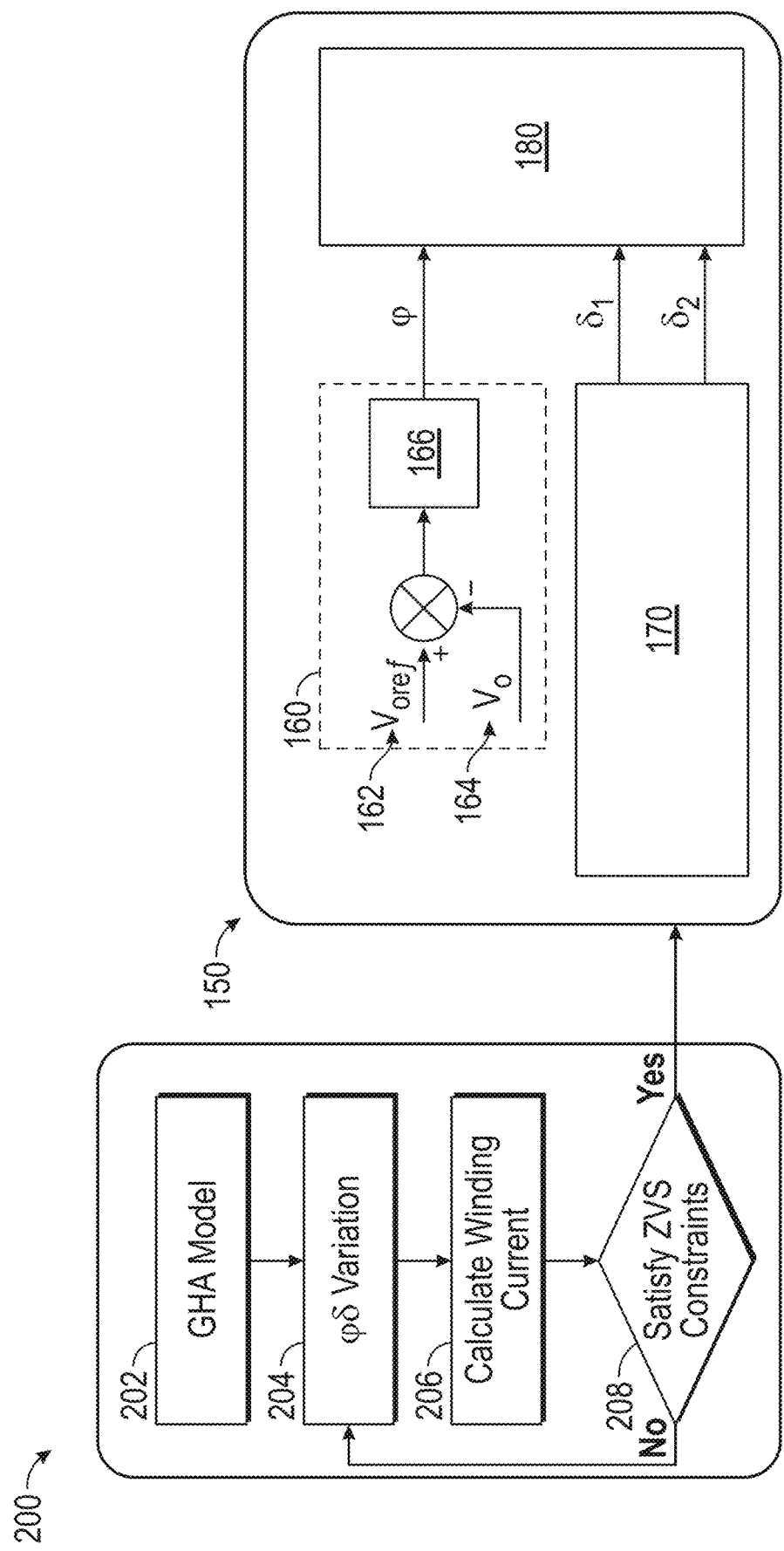
FIG. 2 illustrates an example power converter controller.

FIG. 2 illustrates an example power converter controller 150. In some embodiments, the power converter controller 150 comprises voltage controller 160, memory 170, and signal generator 180. In some embodiments, the voltage controller 160 is configured to receive a value of reference output voltage 162 and a value of output voltage 164. In some embodiments, the value of the reference output voltage 162 is a value of a desired output voltage, and a value of the output voltage 164 is a real-time or actual value of output voltage of the power converter 102. The voltage controller 160 may compare the values of the desired output voltage and actual output voltage and determine whether an adjustment of power converter timing is desirable. In some embodiments, the voltage controller 160 comprises a proportional-integral (PI) controller for feedback adjustment of the power converter output voltage. It is appreciated that other types of controllers may be used for adjustment of the power converter output voltage.

In some embodiments, in accordance with a determination that the reference output voltage 162 and the value of the output voltage 164 is greater than a threshold value, the voltage controller 160 updates a value of $\varphi_1$ and/or $\varphi_2$ to increase or decrease the output voltage (e.g., increasing $\varphi_2$ would increase the output voltage, decreasing $\varphi_2$ would decrease the output voltage) to adjust the output voltage to become closer to the desired output voltage. For example, due to circuit conditions, the actual output voltage may drift from a desired value, and the voltage controller advantageously determine an updated value of 02 and updated timing for switching transistors Q1-Q8 to adjust the output voltage to become closer to the desired output voltage. As another example, the desired output voltage is updated (e.g., in responsive to receiving an indication to update the output voltage (e.g., from the electric vehicle, from a second device controlling the power converter)), and the voltage controller advantageously determine an updated value of $\varphi_2$ and updated timing for switching transistors Q1-Q8 to adjust the output voltage to the new desired output voltage. It is appreciated that the voltage controller 160 may adjust other parameters of the power converter circuit, in addition to $\varphi_1$ and/or $\varphi_2$.

In some embodiments, the memory 170 is configured to store control variables for operating the power converter 102. In some embodiments, the memory 170 comprises a lookup table for storing the control variables. In some embodiments, the memory 170 is configured to store results of a generalized harmonic approximation (GHA) method (described in more detail below). In some embodiments, the GHA method is performed prior to operating the power converter. In some embodiments, the GHA method is performed concurrently while the power converter is operating. In some embodiments, the memory 170 is updated with updated control variables for more accurate and power efficient operation of the power converter 102. In some embodiments, based on the control variables stored in the memory 170, the memory 170 is configured to provide the values $\delta_1$ and $\delta_2$ based on a requirement (e.g., ZVS turn on of all converter devices, power transfer requirement) of the power converter.

In some embodiments, the signal generator 180 is configured to generate control signals for controlling devices of the power converter 102. For example, the signal generator 180 is configured to generate signals for driving the gates of transistors Q1-Q8 to turn the transistors on or off, allowing the power converter to be operated in a low loss manner, as described herein. In some embodiments, the signal generator 180 is configured to receive one or more parameters $\varphi_1$, $\varphi_2$, $\delta_1$, and $\delta_2$ from the voltage controller 160 and memory 170 and generate the control signals based on the received parameters. In some embodiments, the signal generator 180 comprises a pulse width modulation generator.

In some embodiments, the GHA model advantageously consider higher odd-order harmonics to estimate a response of the power converter 102. In some embodiments, the GHA model advantageously provides a more accurate approximation of non-sinusoid waveforms (e.g., $V_{pri}$ and $V_{sec}$). The estimated response (e.g., results from performing the GHA method (e.g., currents at the branches of the power converter for different conditions, voltages at the nodes of the power converter for different conditions)) may be stored in the power converter controller 150. Based on the estimated response, the power converter controller 150 may determine a value of a current (e.g., current through the primary inductor 114, current through the secondary inductor 116) that would allow ZVS turn on of devices Q1-Q8 and provide a desired output voltage (e.g., to precharge capacitor 118 and/or output load 120). Based on the determined value of the currents, the power converter controller 150 may determine the timing of Q1-Q8 to allow the power converter to generate these currents.

In some embodiments, the GHA model is represented by the following equations as functions of $\varphi_1$, $\varphi_2$, $\delta_1$, and $\delta_2$:

$$<V_{pri}>_k = 4V_1/k\pi \cos(k\delta_1) \quad (1)$$

$$<V_{sec}>_k = 4V_2/k\pi \cos(k\delta_2) \quad (2)$$

$$P_{12} = \Sigma_{k=1}^{2i+1} <V_{pri}>_k \cdot <V_{sec}>_k \sin(k\varphi_2)/4k^2\pi f_s L_{12} \quad (3)$$

$$I_{RMS} = \Sigma_{k=1}^{2i+1} <V_{pri}>_k^2 + <V_{sec}>_k^2 - 2<V_{pri}>_k <V_{sec}>_k \cos(k\varphi) \quad (4)$$

Where $<V_{pri}>_k$ and $<V_{sec}>_k$ are the kth harmonic order voltages across the primary inductor 114 and secondary inductor 116, respectively. $P_{12}$ is the transferred power. $I_{RMS}$ is a RMS value of the current through the primary inductor 114. In some embodiments, based on the above equations, for a desired output voltage, the parameters $\varphi_1$, $\varphi_2$, $\delta_1$, and $\delta_2$ may be optimized to determine currents through the primary and secondary inductors to achieve ZVS (and hence the timing of Q1-Q8).

In some embodiments, the power converter 102 is configured to precharge an output capacitor (e.g., precharge capacitor 118), and because a small amount of energy is transferred to the precharge capacitor, an optimization of the above equations may not converge. Therefore, in some embodiments, an additional constraint is added at switching instances of four legs of the power converter 102 under precharge operation, and the constraint matrix maybe given by:

$$[I_{instant}] \geq [I_{ZVSref}] \quad (5)$$

For example, the value of the currents is greater than a minimum current for causing the drain-to-source voltage of the second transistor to become zero (e.g., a minimum current satisfying a ZVS constraint). As an example, the constraint is 25 A. The additional constraint advantageously allows convergence of an optimization solution when the power converter is precharging an output capacitor, allowing ZVS turn on to be achieved at a lower conduction loss (e.g., compared to switching loss without ZVS turn on) and protecting a connected device or system from inrush current.

In some embodiments, the calculation of this optimization is illustrated with respect to GHA method 200. In some embodiments, the GHA method 200 is performed prior to operation of the power converter circuit, and the results from the GHA method are stored in memory 170 for providing control variables to the signal generator 180 to determine power converter timing (for low loss power conversion). In some embodiments, the GHA method is performed after the operation of the power converter circuit, and the results from the GHA method are stored in memory 170 for providing control variables to the signal generator 180 to determine power converter timing (for more efficient/accurate low loss power conversion).

In some embodiments, the method 200 comprises providing a GHA model (step 202), which may comprise equations (1) and (4), information about the operating points of the power converter circuit, power transfer requirement, and design specifications. In some embodiments, the method 200 comprises varying the different $\varphi_1$, $\varphi_2$, $\delta_1$, and $\delta_2$ values (step 204). Based on the variation of the different $\varphi_1$, $\varphi_2$, $\delta_1$, and $\delta_2$ values, currents through the primary inductor 114 and/or secondary inductor 116 are calculated (step 206). In some embodiments, the method 200 comprises determining whether the calculated currents satisfy a ZVS constraint (e.g., equation (5)) (step 208). In accordance with a determination that a calculated current satisfies the constraint, the set of control variables and their associated operating conditions (e.g., power transfer requirement, design specification) are stored in the memory 170 (e.g., for providing suitable control variables to signal generator 180). In accordance with a determination that a calculated current does not satisfy the constraint, the set of control variables and their associated operating conditions (e.g., power transfer requirement, design specification) are not stored in the memory 170 (e.g., the non-satisfactory results are discarded).

FIGS. 3A-3H illustrate example waveforms and schematics for controlling the example power converter 102. The example waveforms may be divided into time sections I to VI. $V_{pri}$ is the voltage across the primary inductor 114. $V_{sec}$ is the voltage across the secondary inductor 116. $I_s$ is the current from the bottom terminal of the secondary inductor 116 to its top terminal. Signals Q5-Q8 of the waveforms are signals for controlling transistors Q5-Q8 (e.g., voltage at the respective gate terminals of the transistors), respectively. In some embodiments, the timing of signals Q5-Q8 is determined and generated by the power converter controller 150, as disclosed herein. In some embodiments, the power converter controller 150 determines the timing of signals Q1-Q8 based on determination of the parameters $\varphi_1$, $\varphi_2$, $\delta_1$, and $\delta_2$.

Figure 3A:
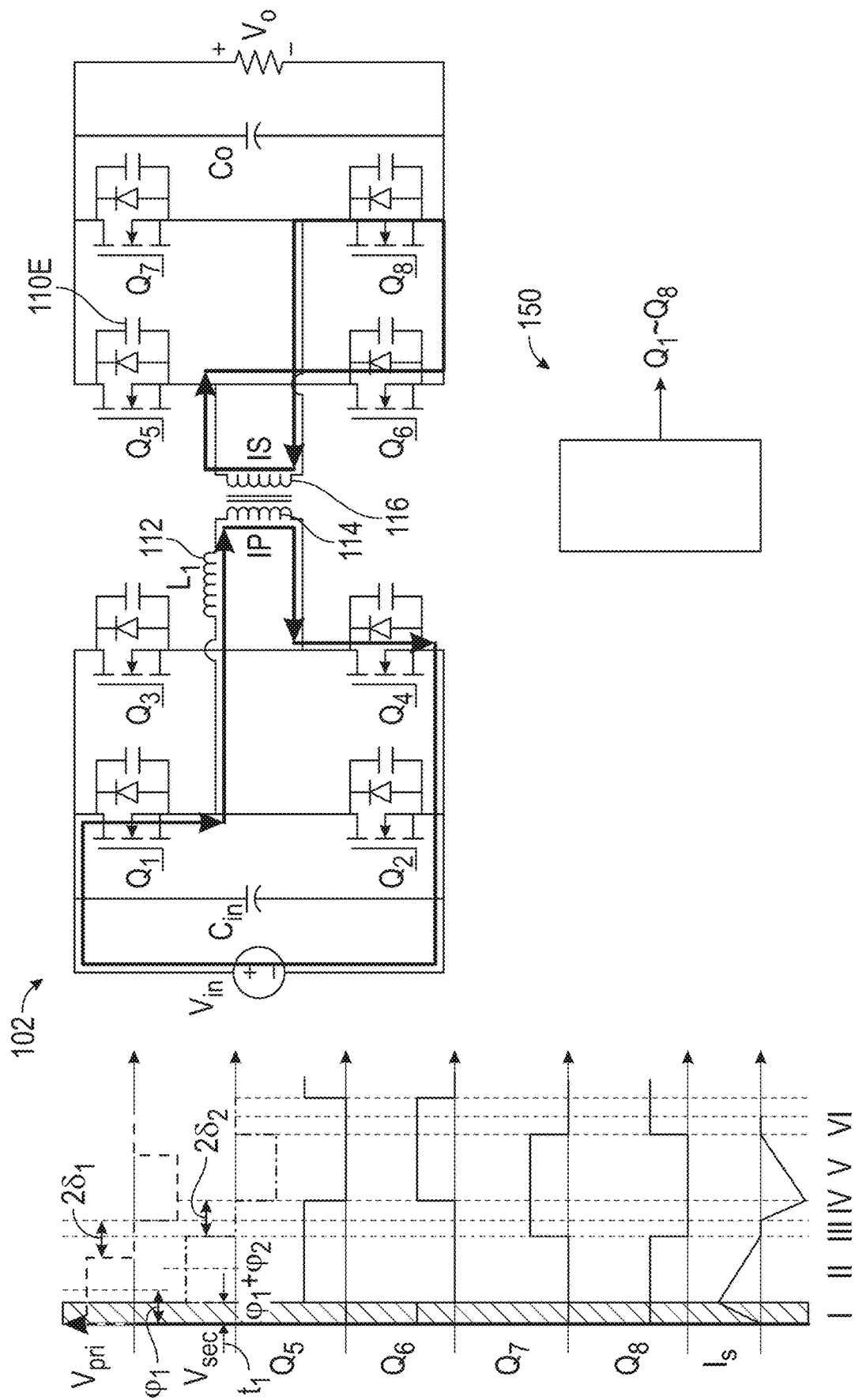
FIGS. 3A-3H illustrate example waveforms and schematics for controlling the example power converter.

As shown in FIG. 3A, during time section I, transistors Q6 and Q8 are turned on by the power converter controller 150, and the current $I_s$ is increased and flows as illustrated. In some embodiments, the primary inductor 114 and the secondary inductor 116 form a transformer, and the current $I_s$ is induced by a current $I_p$ through the primary inductor 114. In some embodiments, the current $I_p$ is caused by the power converter controller 150 turning on transistors Q1 and Q4. At this time, the current $I_p$ charges the shim inductor 112.

In some embodiments, the current $I_s$ is increased until it reaches a value corresponding to a desired output voltage (e.g., a voltage for precharging capacitor 118, a voltage to provide the output load 120). For example, the current $I_s$ may be increased until it reaches a value that would sufficiently precharge capacitor 118 to a desired output voltage for providing the output voltage to the output load 120 (e.g., a battery of an electric vehicle). As another example, the current $I_s$ may be increased until it reaches a value that would provide a desired output voltage for providing the output voltage to the output load 120 (e.g., a battery of an electric vehicle). In some embodiments, for an output voltage of 330V, the peak value of the current $I_s$ at the end of time section I is 25 A. In some embodiments, for an output voltage of 400V, the peak value of the peak value of the current $I_s$ at the end of time section I is 30 A. In some embodiments, for an output voltage of 450V, the peak value of the peak value of the current $I_s$ at the end of time section I is 25 A. It is appreciated that the exemplary peak values are not meant to be limiting. The peak value may be adjustable, depending on design of the power converter 102 and/or power converter controller 150 determination. In some embodiments, the power converter controller 150 determines this value is reached, and in response, the power converter controller 150 turns off transistor Q6 when this value is reached near the end of time section I.

Figure 3B:
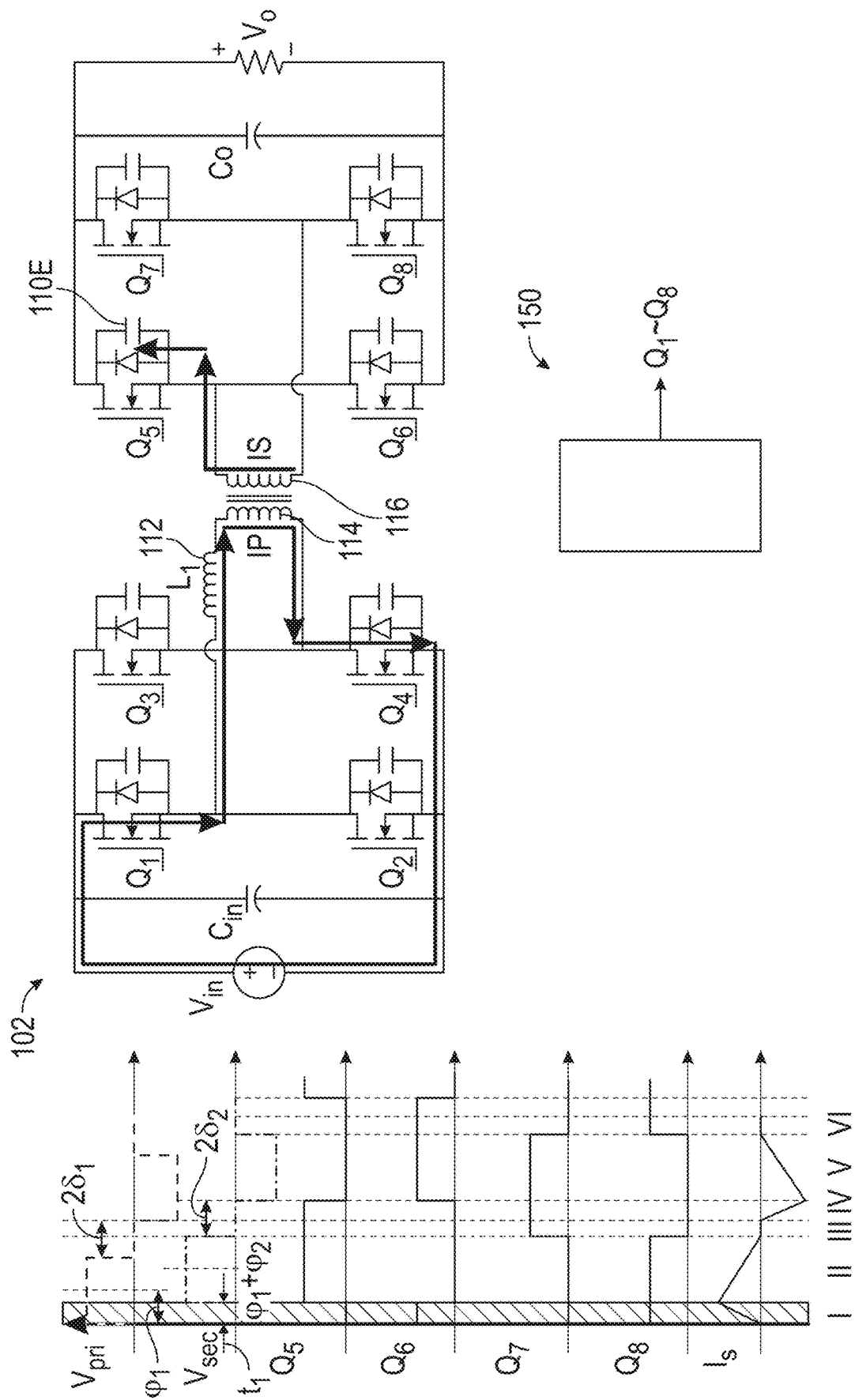

At the end of time section I, because transistor Q6 is turned off and current $I_s$ continues to flow (because $I_p$ continues to flow), as shown in FIG. 3B, the current $I_s$ causes the drain-to-source voltage of transistor Q5 to become zero (e.g., by causing charging of the effective drain-to-source capacitance 110E of Q5 depending on the power converter's input/output voltage ratio, by causing discharging of the effective drain-to-source capacitance 110E of Q5 depending on the power converter's input/output voltage ratio). In some embodiments, the power converter controller 150 determines that the drain-to-source voltage of transistor Q5 becomes zero, and in response, the power converter controller 150 turns on transistor Q5 when the drain-to-source voltage of transistor Q5 is zero, achieving ZVS turn on. Also, at this time, because a desired value of $I_s$ is reached and ZVS turn on of Q5 is achieved, the power converter controller turns off transistor Q1 to stop the shim inductor 112 from charging.

In some embodiments, the power converter controller 150 determines $\varphi_1$, and hence, the pulse width of $V_{pri}$, to allow the shim inductor 112 to be sufficiently charged (e.g., to sufficiently provide a current for time section II). Because pi is determined, the power converter controller 150 may further determine how to switch Q1-Q4 to generate this pulse width.

Figure 3C:
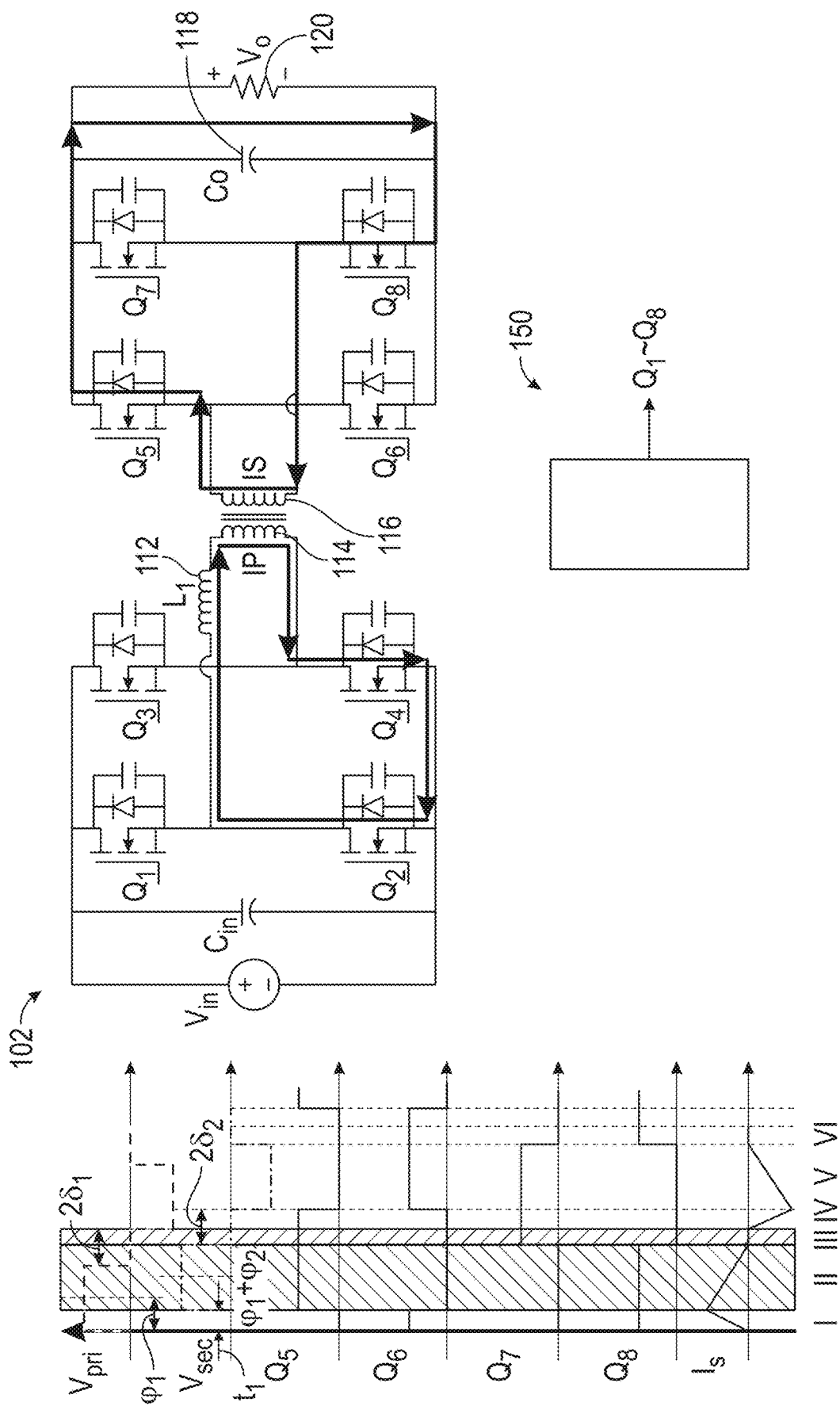

As shown in FIG. 3C, during time section II, transistors Q5 and Q8 are turned on by the power converter controller 150, and the current $I_s$ is decreased and flows as illustrated. On the primary side of the power converter 102, Q2 turns on to allow the shim inductor 112 to discharge (e.g., $I_P$ is decreasing). Because $I_P$ is decreasing, $I_s$ is also decreasing, and $I_s$ precharges the capacitor 118 and/or charges the output load 120 to the desired voltage. Current $I_s$ continues precharge the capacitor 118 and/or charge the output load 120 while the desired voltage is reached. In some embodiments, the power converter controller 150 determines that the desired voltage is provided (e.g., at the beginning of time section III), and in response, the power converter controller 150 turns off transistor Q8. In some embodiments, when the desired voltage is provided, the value of $I_s$ is a small current close to zero.

In some embodiments, the power converter controller 150 determines $\varphi_2$, and hence, the pulse width of $V_{sec}$, to allow the precharge capacitor 118 and/or output load 120 to be sufficiently charged (e.g., to provide the desired output voltage). Because $\varphi_2$ is determined, the power converter controller 150 may further determine how to switch Q5-Q8 to generate this pulse width.

Figure 3D:
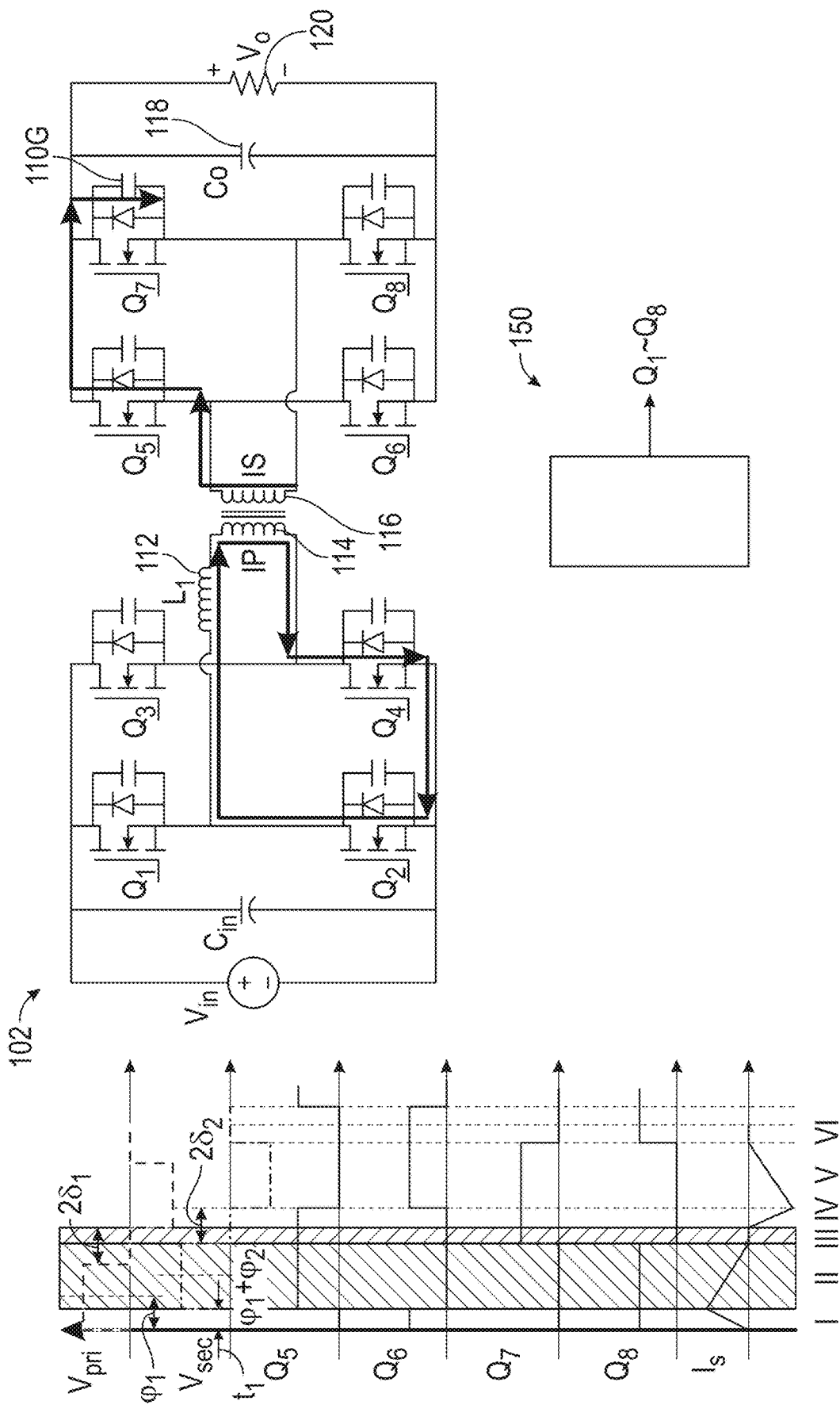

The shim inductor continues to discharge, and $I_s$ continues to flow. As shown in FIG. 3D, because Q8 is turned off by the power converter controller 150 and $I_s$ continues to flow, the current $I_s$ causes the drain-to-source voltage of transistor Q7 to become zero (e.g., by causing charging of the effective drain-to-source capacitance 110G of Q7 depending on the power converter's input/output voltage ratio, by causing discharging of the effective drain-to-source capacitance 110G of Q7 depending on the power converter's input/output voltage ratio). In some embodiments, the power converter controller 150 determines that the drain-to-source voltage of transistor Q7 becomes zero, and in response, the power converter controller 150 turns on transistor Q7 when the drain-to-source voltage of transistor Q7 is zero, achieving ZVS turn on.

In some embodiments, the power converter controller 150 determines $\delta_1$, and hence, half of a time when $V_{pri}$ is zero between voltage pulses (e.g., half of the inner phase shift), to allow the shim inductor 112 to sufficiently discharged (e.g., to cause $I_s$ to charge the precharge capacitor 118 and/or the output load 120, to achieve ZVS turn on of Q7). Because $\delta_1$ is determined, the power converter controller 150 may further determine how to switch Q1-Q4 to cause $V_{pri}$ to become zero to generate this inner phase shift.

For example, for precharging capacitor 118 to 330 V, $\delta_1$ is 1.15 radians. As another example, for precharging capacitor 118 to 400 V, $\delta_1$ is 0.92 radian. As another example, for precharging capacitor 118 to 450 V, $\delta_1$ is 0.82 radian. It is appreciated that the exemplary phase values are not meant to be limiting. The phase value may be adjustable, depending on design of the power converter 102 and/or power converter controller 150 determination.

Figure 3E:
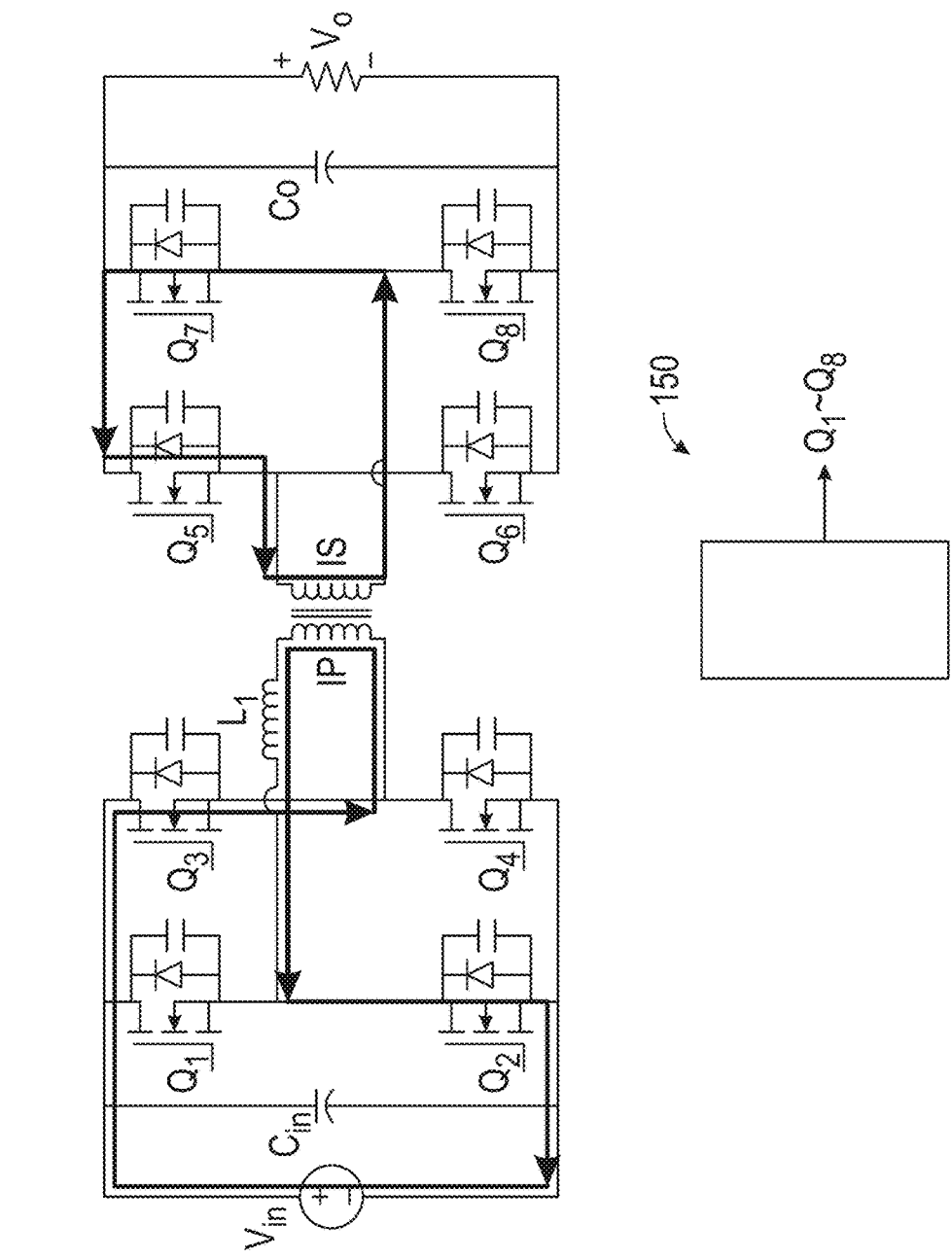
Figure 3E:
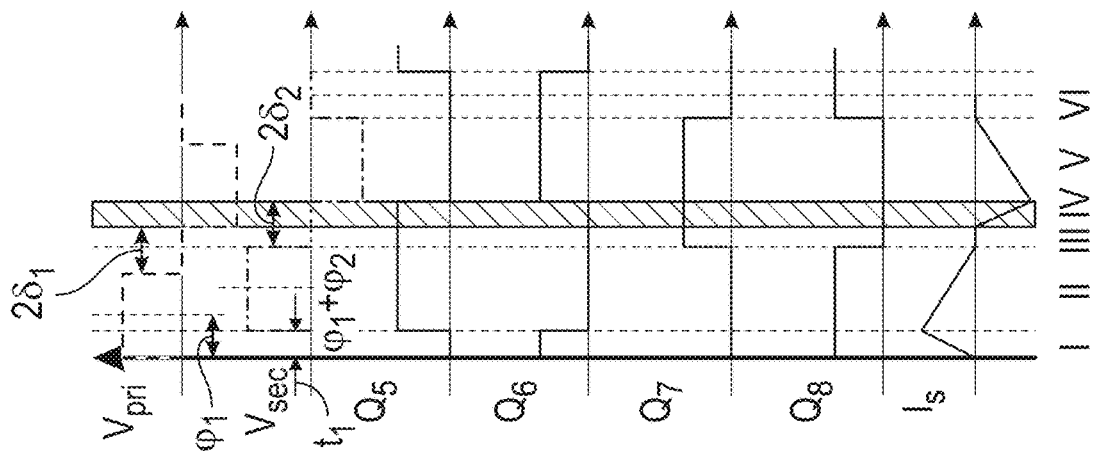

As shown in FIG. 3E, during time section IV, transistors Q5 and Q7 are turned on by the power converter controller 150, and the current $I_s$ is increased (e.g., in an opposite direction, compared to time section I) and flows as illustrated. In some embodiments, the current $I_s$ is induced by a current $I_p$ (e.g., in an opposite direction, compared to time section I) through the primary inductor 114. In some embodiments, the current $I_p$ is caused by the power converter controller 150 turning on transistors Q2 and Q3. At this time, the current $I_p$ charges the shim inductor 112.

In some embodiments, the current $I_s$ is increased until it reaches a value corresponding to a desired output voltage (e.g., a voltage for precharging capacitor 118, a voltage to provide the output load 120). For example, the current $I_s$ may be increased until it reaches a value that would sufficiently precharge capacitor 118 to a desired output voltage for providing the output voltage to the output load 120 (e.g., a battery of an electric vehicle). As another example, the current $I_s$ may be increased until it reaches a value that would provide a desired output voltage for providing the output voltage to the output load 120 (e.g., a battery of an electric vehicle). In some embodiments, for an output voltage of 330V, the peak value of the current $I_s$ at the end of time section I is −25 A. In some embodiments, for an output voltage of 400V, the peak value of the peak value of the current $I_s$ at the end of time section I is −30 A. In some embodiments, for an output voltage of 450V, the peak value of the peak value of the current $I_s$ at the end of time section I is −25 A. It is appreciated that the exemplary peak values are not meant to be limiting. The peak value may be adjustable, depending on design of the power converter 102 and/or power converter controller 150 determination. In some embodiments, the power converter controller 150 determines this value is reached, and in response, the power converter controller 150 turns off transistor Q5 when this value is reached near the end of time section IV.

Figure 3F:
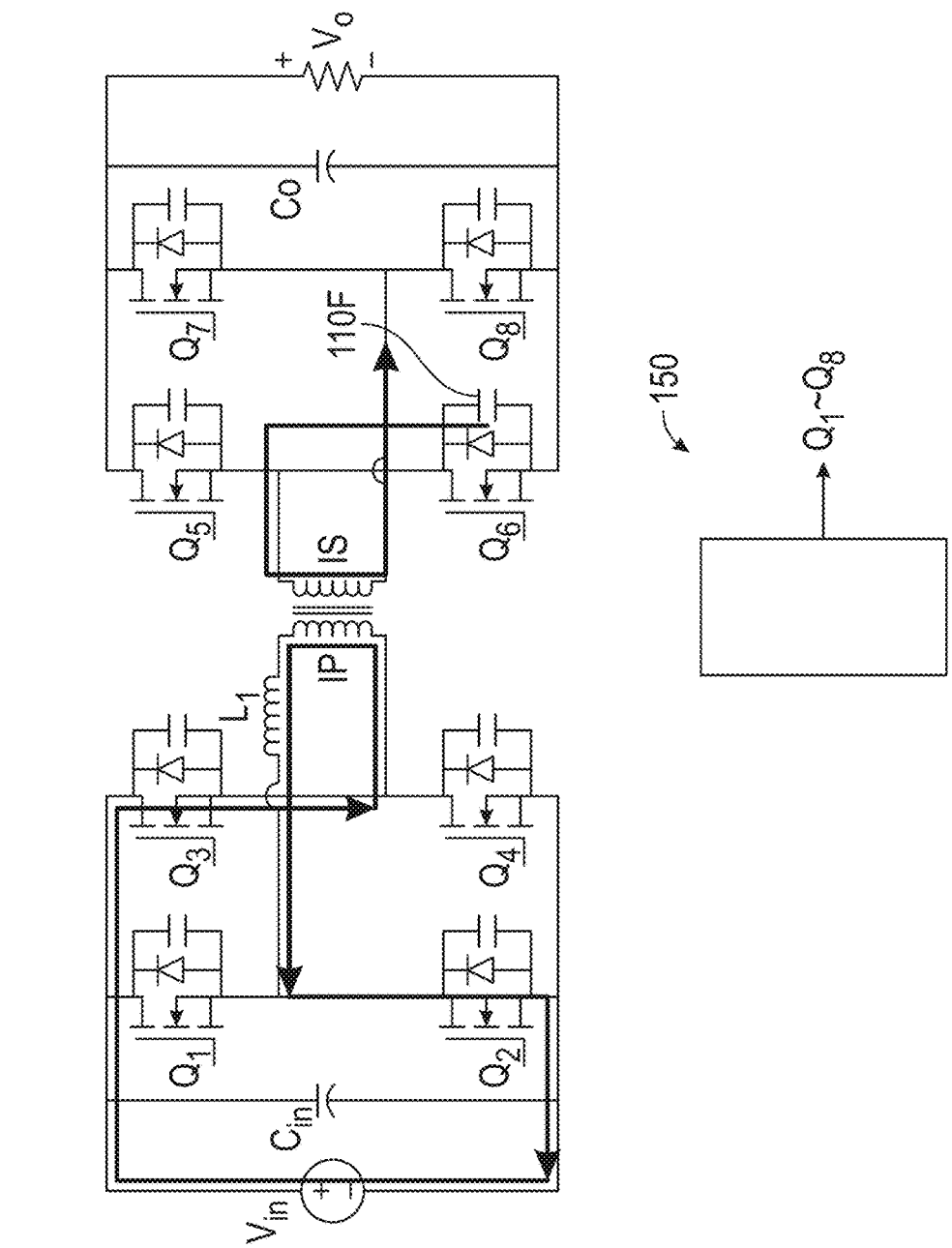
Figure 3F:
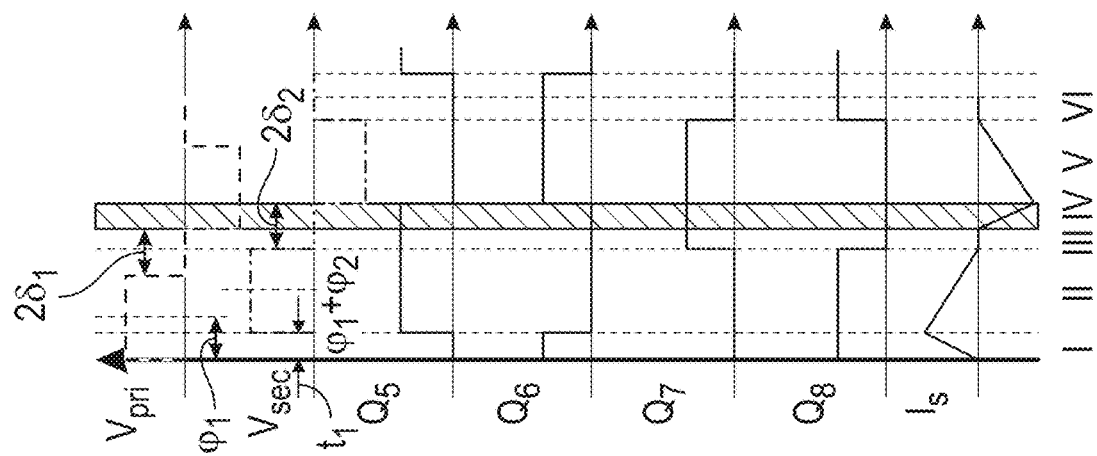

At the end of time section IV, because transistor Q5 is turned off and current $I_s$ continues to flow (because $I_p$ continues to flow), as shown in FIG. 3F, the current $I_s$ causes the drain-to-source voltage of transistor Q6 to become zero (e.g., by causing charging of the effective drain-to-source capacitance 110F of Q6 depending on the power converter's input/output voltage ratio, by causing discharging of the effective drain-to-source capacitance 110F of Q6 depending on the power converter's input/output voltage ratio). In some embodiments, the power converter controller 150 determines that the drain-to-source voltage of transistor Q6 becomes zero, and in response, the power converter controller 150 turns on transistor Q6 when the drain-to-source voltage of transistor Q6 is zero, achieving ZVS turn on. Also, at this time, because a desired value of $I_s$ is reached and ZVS turn on of Q6 is achieved, the power converter controller turns off transistor Q2 to stop the shim inductor 112 from charging.

In some embodiments, the power converter controller 150 determines $\varphi_1$, and hence, the pulse width of $V_{pri}$, to allow the shim inductor 112 to be sufficiently charged (e.g., to sufficiently provide a current for time section V). Because $\varphi_1$ is determined, the power converter controller 150 may further determine how to switch Q1-Q4 to generate this pulse width.

In some embodiments, the power converter controller 150 determines 82, and hence, half of a time when $V_{sec}$ is zero between voltage pulses (e.g., half of the inner phase shift), to allow ZVS turn on of Q7 and allow $I_s$ to increase to a desired value. Because 82 is determined, the power converter controller 150 may further determine how to switch Q5-Q8 to cause $V_{pri}$ to become zero to generate this inner phase shift.

For example, for precharging capacitor 118 to 330 V, $\delta_2$ is 0.67 radian. As another example, for precharging capacitor 118 to 400 V, $\delta_2$ is 0.48 radian. As another example, for precharging capacitor 118 to 450 V, $\delta_2$ is 0.48 radian. It is appreciated that the exemplary phase values are not meant to be limiting. The phase value may be adjustable, depending on design of the power converter 102 and/or power converter controller 150 determination.

Figure 3G:
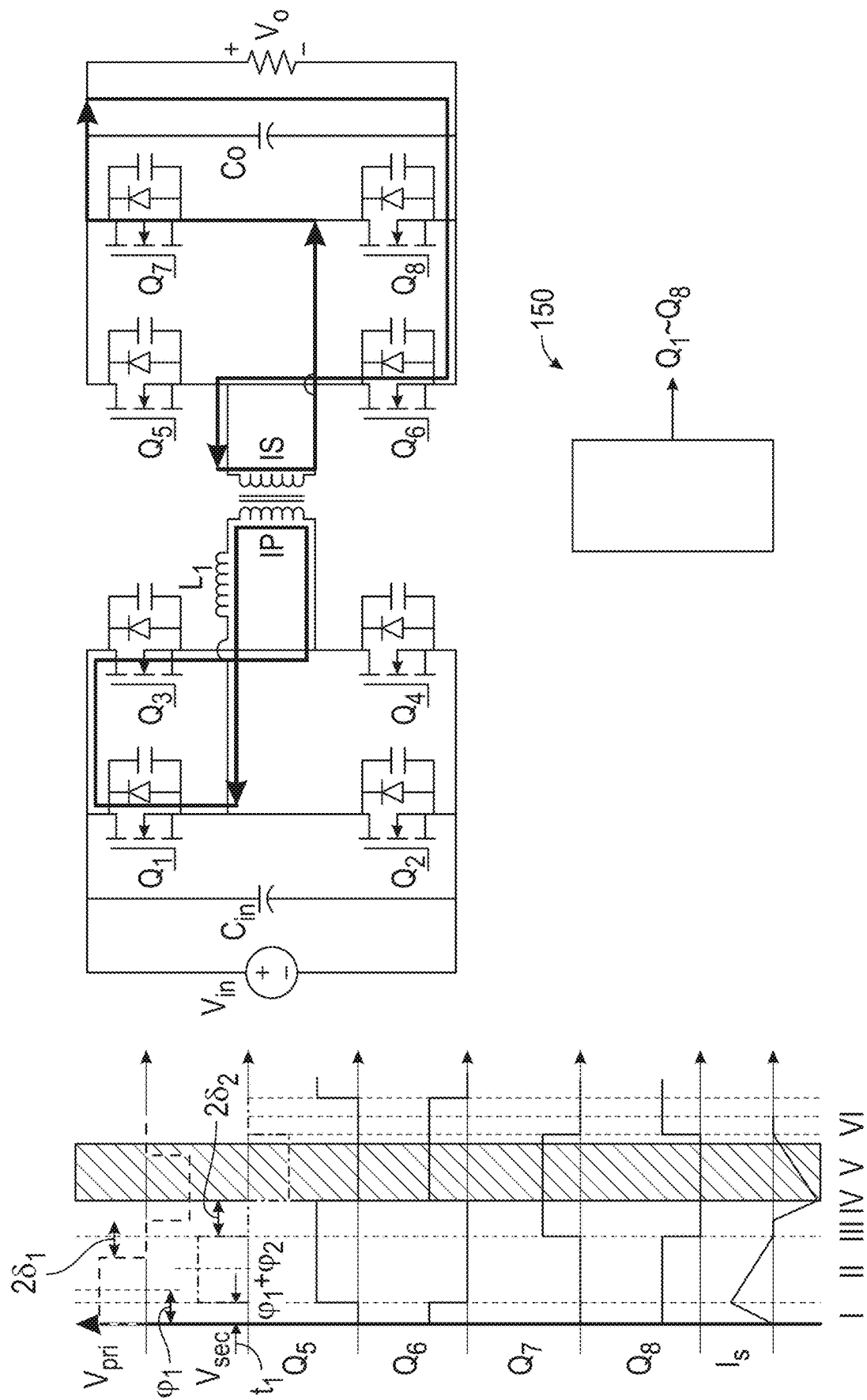

As shown in FIG. 3G, during time section V, transistors Q6 and Q7 are turned on by the power converter controller 150, and the current $I_s$ is decreased (e.g., in an opposite direction, compared to time section II) and flows as illustrated. On the primary side of the power converter 102, Q2 turns on to allow the shim inductor 112 to discharge (e.g., $I_p$ is decreasing in an opposite direction, compared to time section II). Because $I_p$ is decreasing, $I_s$ is also decreasing, and $I_s$ precharges the capacitor 118 and/or charges the output load 120 to the desired voltage. Current $I_s$ continues precharge the capacitor 118 and/or charge the output load 120 while the desired voltage is reached. In some embodiments, the power converter controller 150 determines that the desired voltage is provided (e.g., at the beginning of time section VI), and in response, the power converter controller 150 turns off transistor Q7. In some embodiments, when the desired voltage is provided, the value of $I_s$ is a small current (e.g., in an opposite direction, compared to time section II) close to zero.

In some embodiments, the power converter controller 150 determines $\varphi_2$, and hence, the pulse width of $V_{sec}$, to allow the precharge capacitor 118 and/or output load 120 to be sufficiently charged (e.g., to provide the desired output voltage). Because $\varphi_2$ is determined, the power converter controller 150 may further determine how to switch Q5-Q8 to generate this pulse width.

Figure 3H:
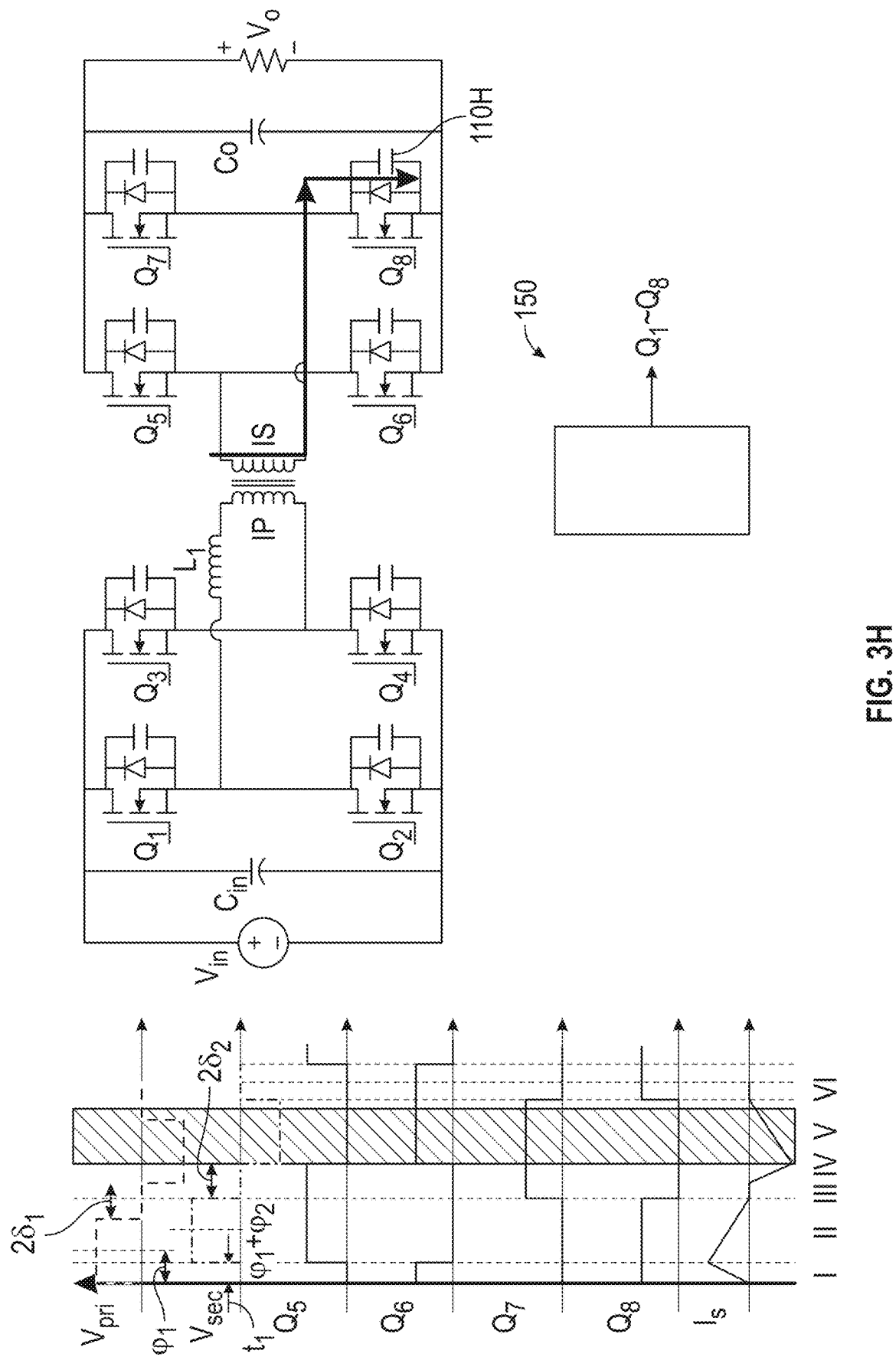

The shim inductor continues to discharge, and $I_s$ continues to flow. As shown in FIG. 3H, because Q8 is turned off by the power converter controller 150 and $I_s$ continues to flow, the current $I_s$ causes the drain-to-source voltage of transistor Q8 to become zero (e.g., by causing charging of the effective drain-to-source capacitance 110H of Q8 depending on the power converter's input/output voltage ratio, by causing discharging of the effective drain-to-source capacitance 110H of Q8 depending on the power converter's input/output voltage ratio). In some embodiments, the power converter controller 150 determines that the drain-to-source voltage of transistor Q8 becomes zero, and in response, the power converter controller 150 turns on transistor Q8 when the drain-to-source voltage of transistor Q8 is zero, achieving ZVS turn on.

In some embodiments, the power converter controller 150 determines 81, and hence, half of a time when $V_{pri}$ is zero between voltage pulses (e.g., half of the inner phase shift), to allow the shim inductor 112 to sufficiently discharged (e.g., to cause $I_s$ to charge the precharge capacitor 118 and/or the output load 120, to achieve ZVS turn on of Q8). Because $\delta_1$ is determined, the power converter controller 150 may further determine how to switch Q1-Q4 to cause $V_{pri}$ to become zero to generate this inner phase shift.

In some embodiments, the power converter controller 150 determines how to switch Q1-Q4 to achieve ZVS turn on of these devices. For example, as described with respect to FIGS. 3F and 3G, prior to turning on Q1, Q2 is turned off by the power converter controller 150. Because Q2 is turned off, the current $I_p$ causes the drain-to-source voltage of transistor Q1 to become zero (e.g., by causing charging of the effective drain-to-source capacitance 110A of Q1 depending on the power converter's input/output voltage ratio, by causing discharging of the effective drain-to-source capacitance 110A of Q1 depending on the power converter's input/output voltage ratio). The power converter controller 150 may determine the time when the drain-to-source voltage of transistor Q1 becomes zero and turn on Q1 at this time, achieving ZVS turn on of Q1.

As another example, as described with respect to FIGS. 3A, 3G, and 3H, prior to turning on Q4, Q3 is turned off by the power converter controller 150. Because Q3 is turned off, the current $I_P$ causes the drain-to-source voltage of transistor Q4 to become zero (e.g., by causing charging of the effective drain-to-source capacitance 110D of Q4 depending on the power converter's input/output voltage ratio, by causing discharging of the effective drain-to-source capacitance 110D of Q4 depending on the power converter's input/output voltage ratio). The power converter controller 150 may determine the time when the drain-to-source voltage of transistor Q4 becomes zero and turn on Q4 at this time, achieving ZVS turn on of Q4.

In some embodiments, the operations of the voltage output circuit 100 described with respect to FIGS. 3A-3H may be repeated in a periodic manner to continually precharge the capacitor 118 and/or charge the output load 120 to the desired voltage.

In some embodiments, the power converter controller 150 determines $\delta_2$, and hence, half of a time when $V_{sec}$ is zero between voltage pulses (e.g., half of the inner phase shift), to allow ZVS turn on of Q8 and allow $I_s$ to increase to a desired value (for a next cycle). Because $\delta_2$ is determined, the power converter controller 150 may further determine how to switch Q5-Q8 to cause $V_{pri}$ to become zero to generate this inner phase shift.

Figure 4:
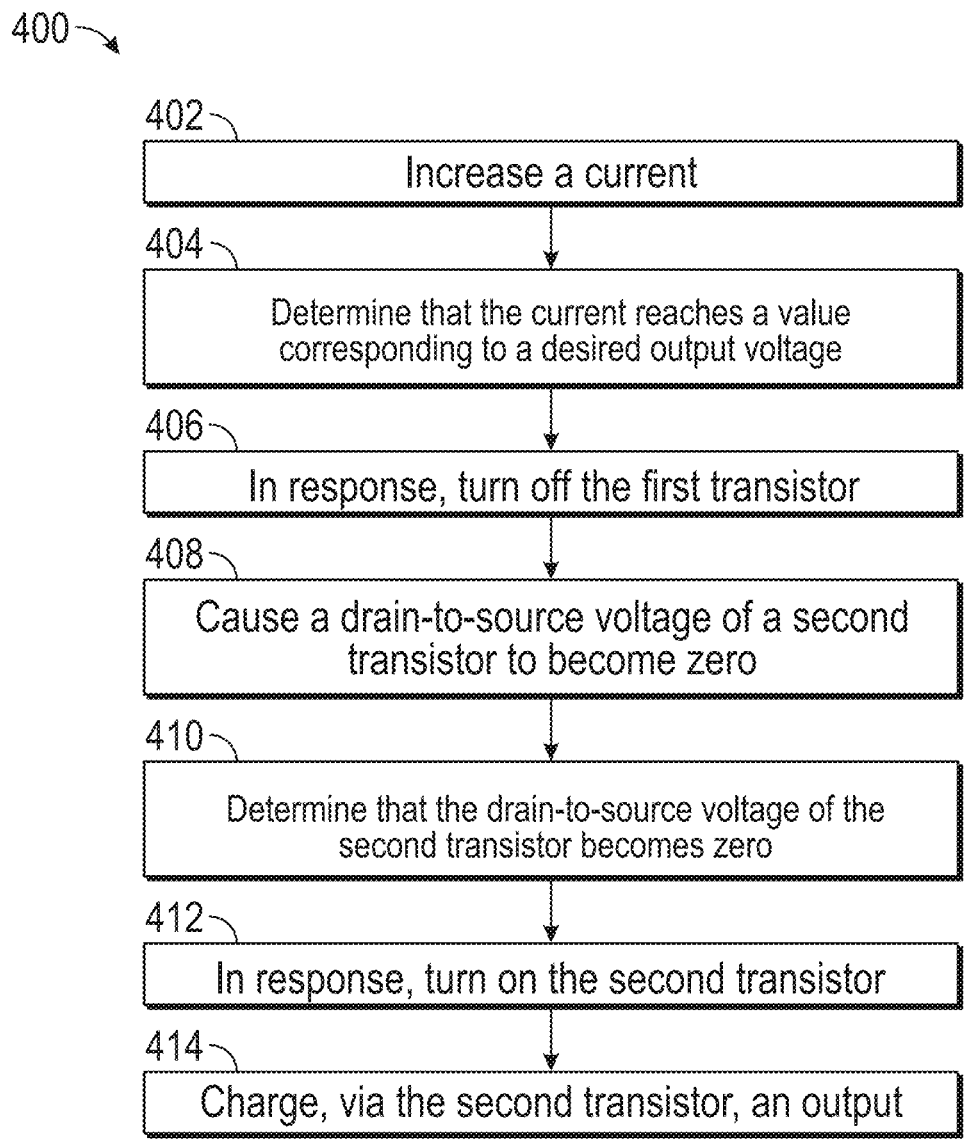
FIG. 4 illustrates an example method for controlling a power converter.

FIG. 4 illustrates an example method 400 for controlling a power converter. In some embodiments, the method 400 allows the power converter to provide a desired output voltage. In some embodiments, the method 400 allows the power converter to be operated in a low loss manner. In some embodiments, the example method 400 allows a sufficient amount of transformer primary and secondary currents in the power converter to achieve ZVS turn on of the converter devices to reduce switching power loss and increase power conversion efficiency (e.g., an amount of conduction power consumed for achieving ZVS is less than switching power loss without ZVS), while allowing an output capacitor to be precharged to protect a load (e.g. charging circuitry and/or battery of an electric vehicle) connected to the power converter. In some embodiments, the method 400 is performed to operate voltage output circuit 100 for controlling the power converter 102 to achieve the disclosed advantages.

In some embodiments, the method 400 comprises increasing a current through a first transistor (step 402). For example, as described with respect to FIG. 3A, the current $I_s$ is increased through transistor Q6 during time section I. As another example, as described with respect to FIG. 3E, the current $I_s$ is increased (e.g., in an opposite direction, compared to time section I) through transistor Q5 during time section IV.

In some embodiments, when the current is increasing, the current does not flow past an output of the voltage output circuit. For example, as described with respect to FIG. 3A, as the current $I_s$ is increased through transistor Q6 during time section I, the current is not provided to the precharge capacitor 118 or output load 120, and the voltage across the secondary inductor 116 is zero. As another example, as described with respect to FIG. 3E, as the current $I_s$ is increased through transistor Q5 during time section IV, the current is not provided to the precharge capacitor 118 or output load 120, and the voltage across the secondary inductor 116 is zero.

In some embodiments, the method 400 comprises, when the current is increased through the first transistor, charging a shim inductor. For example, as described with respect to FIG. 3A, as the current $I_s$ is increased through transistor Q6 during time section I, the current $I_p$ is charging shim capacitor 112. As another example, as described with respect to FIG. 3E, as the current $I_s$ is increased through transistor Q5 during time section IV, the current $I_p$ is charging shim capacitor 112.

In some embodiments, the current through the first transistor is provided by a secondary inductor; and a primary inductor induces the current provided by the secondary inductor. For example, as described with respect to FIG. 3A, the current $I_s$ through transistor Q6 is provided by secondary inductor 116, and the primary inductor 114 induces the current $I_s$. As another example, as described with respect to FIG. 3E, the current $I_s$ through transistor Q5 is provided by secondary inductor 116, and the primary inductor 114 induces the current $I_s$.

In some embodiments, the method 400 comprises determining that the current reaches a value corresponding to a desired output voltage (step 404). For example, as described with respect to FIG. 3A, the power converter controller 150 determines that the current $I_s$ reaches a peak value corresponding to a desired output voltage during time section I. As another example, as described with respect to FIG. 3E, the power converter controller 150 determines that the current $I_s$ reaches a peak value (e.g., in an opposite direction, compared to time section I) corresponding to a desired output voltage during time section IV. In some embodiments, the time when the current $I_s$ reaches the peak value corresponds to a phase of the voltage across the secondary inductor. For example, to determine when the current $I_s$ should peak and to turn on Q5, the power converter controller 150 determines a phase $\varphi_2$ of the pulse of $V_{sec}$.

In some embodiments, the value of the current corresponding to the output voltage is greater than a minimum current for causing the drain-to-source voltage of the second transistor to become zero. For example, as described with respect to FIG. 2, the value of the peak current satisfies a minimum ZVS constraint. In some embodiments, the time when the current $I_s$ reaches the peak value is determined based on a result from performing a generalized harmonic approximation (GHA) method. For example, as described with respect to FIG. 2, the GHA method is used to determine one or more of $\varphi_1$, $\varphi_2$, $\delta_1$, and $\delta_2$. In some embodiments, the method 400 comprises storing a result of the GHA method. For example, as described with respect to FIG. 2, the results of the generalized harmonic approximation method is stored in the power converter controller 150.

In some embodiments, the method 400 comprises turning off the first transistor in response to determining that the current reaches the value corresponding to the desired output voltage (step 406). For example, as described with respect to FIGS. 3A and 3B, in response to determining that the current $I_s$ reaches the peak value, the power converter controller 150 turns off transistor Q6. As another example, as described with respect to FIGS. 3E and 3F, in response to determining that the current $I_s$ reaches the peak value, the power converter controller 150 turns off transistor Q5.

In some embodiments, the method 400 comprises in response to turning off the first transistor, causing a drain-to-source voltage of a second transistor to become zero (step 408). For example, as described with respect to FIG. 3B, in response to transistor Q6 being turned off, the drain-to-source voltage of Q5 is caused to become zero. As another example, as described with respect to FIG. 3F, in response to transistor Q5 being turned off, the drain-to-source voltage of Q6 is caused to become zero.

In some embodiments, the method 400 comprises determining that the drain-to-source voltage of the second transistor becomes zero (step 410). For example, as described with respect to FIGS. 3B and 3C, the power converter controller 150 determines that the drain-to-source voltage of Q5 becomes zero (e.g., by discharging the effective drain-to-source capacitance 110E of Q5). As another example, as described with respect to FIGS. 3F and 3G, the power converter controller 150 determines that the drain-to-source voltage of Q6 becomes zero (e.g., by discharging the effective drain-to-source capacitance 110F of Q6).

In some embodiments, the method 400 comprises turning on the second transistor in response to determining that the drain-to-source voltage of the second transistor becomes zero (step 412). For example, as described with respect to FIGS. 3B and 3C, the power converter controller 150 determines that the drain-to-source voltage of Q5 becomes zero, and in response, the power converter controller 150 turns on Q5, achieving ZVS turn on of Q5. As another example, the power converter controller 150 determines that the drain-to-source voltage of Q6 becomes zero, and in response, the power converter controller 150 turns on Q6, achieving ZVS turn on of Q6.

In some embodiments, the method comprises charging, via the second transistor, an output to an output voltage (step 414). For example, as described with respect to FIG. 3C, the precharge capacitor 118 and/or the output load 120 are charged via the transistor Q5 to provide a desired output voltage. As another example, as described with respect to FIG. 3G, the precharge capacitor 118 and/or the output load 120 are charged via the transistor Q6 to provide a desired output voltage. In some embodiments, the desired output voltage is an output voltage for charging an electric vehicle. In some embodiments, the output voltage is between 200 volts and 1000 volts.

In some embodiments, the method 400 comprises discharging the shim inductor, and a current for charging the output to the output voltage is induced by discharging the shim inductor. For example, as described with respect to FIGS. 3C and 3G, the shim capacitor 112 discharges and induces the current $I_s$ for charging the output.

In some embodiments, the first current flows past a third transistor, and the output is charged further via the third transistor. For example, as described with respect to FIGS. 3A and 3C, the current $I_s$ also flows past transistor Q8, and the output is charged further via Q8. As another example, as described with respect to FIGS. 3E and 3G, the current $I_s$ also flows past transistor Q7, and the output is charged further via Q7.

In some embodiments, the method 400 comprises determining that the charging of the output is completed. For example, as described with respect to FIGS. 3C and 3G, the power converter controller 150 determines charging of the precharge capacitor 118 and/or output load 120 is completed.

In some embodiments, the method 400 comprises turning off the third transistor; and causing a drain-to-source voltage of a fourth transistor to become zero. For example, as described with respect to FIGS. 3C and 3D, the power converter controller 150 determines charging of the precharge capacitor 118 and/or output load 120 is completed, and in response, the power converter controller 150 turns off Q8, causing the drain-to-source voltage of Q7 to become zero. As another example, as described with respect to FIGS. 3G and 3H, the power converter controller 150 determines charging of the precharge capacitor 118 and/or output load 120 is completed, and in response, the power converter controller 150 turns off Q7, causing the drain-to-source voltage of Q8 to become zero.

In some embodiments, the method 400 comprises determining that the drain-to-source voltage of the fourth transistor becomes zero. For example, as described with respect to FIG. 3D, the power converter controller 150 determines that the drain-to-source voltage of Q7 becomes zero. As another example, as described with respect to FIG. 3H, the power converter controller 150 determines that the drain-to-source voltage of Q8 becomes zero.

In some embodiments, the method 400 comprises turning on the fourth transistor in response to determining that the drain-to-source voltage of the fourth transistor becomes zero. For example, as described with respect to FIGS. 3D and 3E, the power converter controller 150 determines that the drain-to-source voltage of Q7 becomes zero, and in response, the power converter controller 150 turns on Q7, achieving ZVS turn on of Q7. As another example, as described with respect to FIGS. 3A and 3H, the power converter controller 150 determines that the drain-to-source voltage of Q8 becomes zero, and in response, the power converter controller 150 turns on Q8, achieving ZVS turn on of Q8.

In some embodiments, the method 400 comprises increasing a third current through the second and fourth transistors to reach a second value corresponding to the output voltage. For example, as described with respect to FIGS. 3D and 3E, after ZVS turn on of Q7 is achieved, the current $I_s$ is increased through Q5 and Q7.

In some embodiments, the method 400 comprises increasing a second current through the second transistor. For example, as described with respect to FIG. 3E, after providing the output voltage during time section II, the current $I_s$ is increased (e.g., in an opposite direction, compared to time section I) through transistor Q5 during time section IV. In some embodiments, the method 400 comprises determining that the second current reaches a second value corresponding to the output voltage. For example, as described with respect to FIG. 3E, the power converter controller 150 determines that the current $I_s$ reaches a peak value (e.g., in an opposite direction, compared to time section I) corresponding to a desired output voltage during time section IV.

In some embodiments, the method 400 comprises turning off the second transistor in response to determining that the second current reaches the second value. For example, as described with respect to FIGS. 3E and 3F, in response to determining that the current $I_s$ reaches the peak value, the power converter controller 150 turns off transistor Q5. In some embodiments, the method 400 comprises in response to turning off the second transistor, causing a drain-to-source voltage of the first transistor to become zero. For example, as described with respect to FIG. 3F, in response to transistor Q5 being turned off, the drain-to-source voltage of Q6 is caused to become zero.

In some embodiments, the method 400 comprises determining that the drain-to-source voltage of the first transistor becomes zero. For example, as described with respect to FIGS. 3F and 3G, the power converter controller 150 determines that the drain-to-source voltage of Q6 becomes zero (e.g., by discharging the effective drain-to-source capacitance 110F of Q6). In some embodiments, the method 400 comprises turning on the first transistor in response to determining that the drain-to-source voltage of the first transistor becomes zero. For example, as described with respect to FIGS. 3F and 3G, the power converter controller 150 determines that the drain-to-source voltage of Q6 becomes zero, and in response, the power converter controller 150 turns on Q6, achieving ZVS turn on of Q6.

In some embodiments, the method 400 comprises charging, via the first transistor, an output to the output voltage. For example, as described with respect to FIG. 3G, the precharge capacitor 118 and/or the output load 120 are charged via the transistor Q6 to provide a desired output voltage.

In some embodiments, the method 400 comprises causing a drain-to-source voltage of a fifth transistor to become zero, and turning on the fifth transistor. For example, as described with respect to FIGS. 3A-3H, a drain-to-source voltage of one of transistors Q1-Q4 is caused to be zero. The power converter controller 150 determines that the drain-to-source voltage becomes zero, and in response, the power converter controller 150 turns on the respective transistor to achieve ZVS turn on. In some embodiments, the method 400 comprises flowing, past the fifth transistor, a third current to the primary inductor to induce the current provided by the secondary inductor. For example, after ZVS turn on of one or more of transistors Q1-Q4 is achieved, the current $I_p$ flows past through these transistors and the primary inductor 114 to induce current $I_s$ through the secondary inductor 116.

In some embodiments, the method 400 comprises receiving an indication to update the output voltage to a second output voltage, and in response to receiving the indication to update the output voltage to the second output voltage, determining that the current reaches a value corresponding to the second output voltage. For example, as described with respect to FIG. 2, the power converter controller 150 receives an indication to update the desired output voltage. In response to receiving the indication, the voltage controller 160 of the power converter controller 150 updates the parameters $\varphi_1$ and $\varphi_2$ for providing the new desired output voltage, using the operations described herein.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for controlling a power converter including the particular steps of the method of FIG. 4, this disclosure contemplates any suitable method for controlling a power converter including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
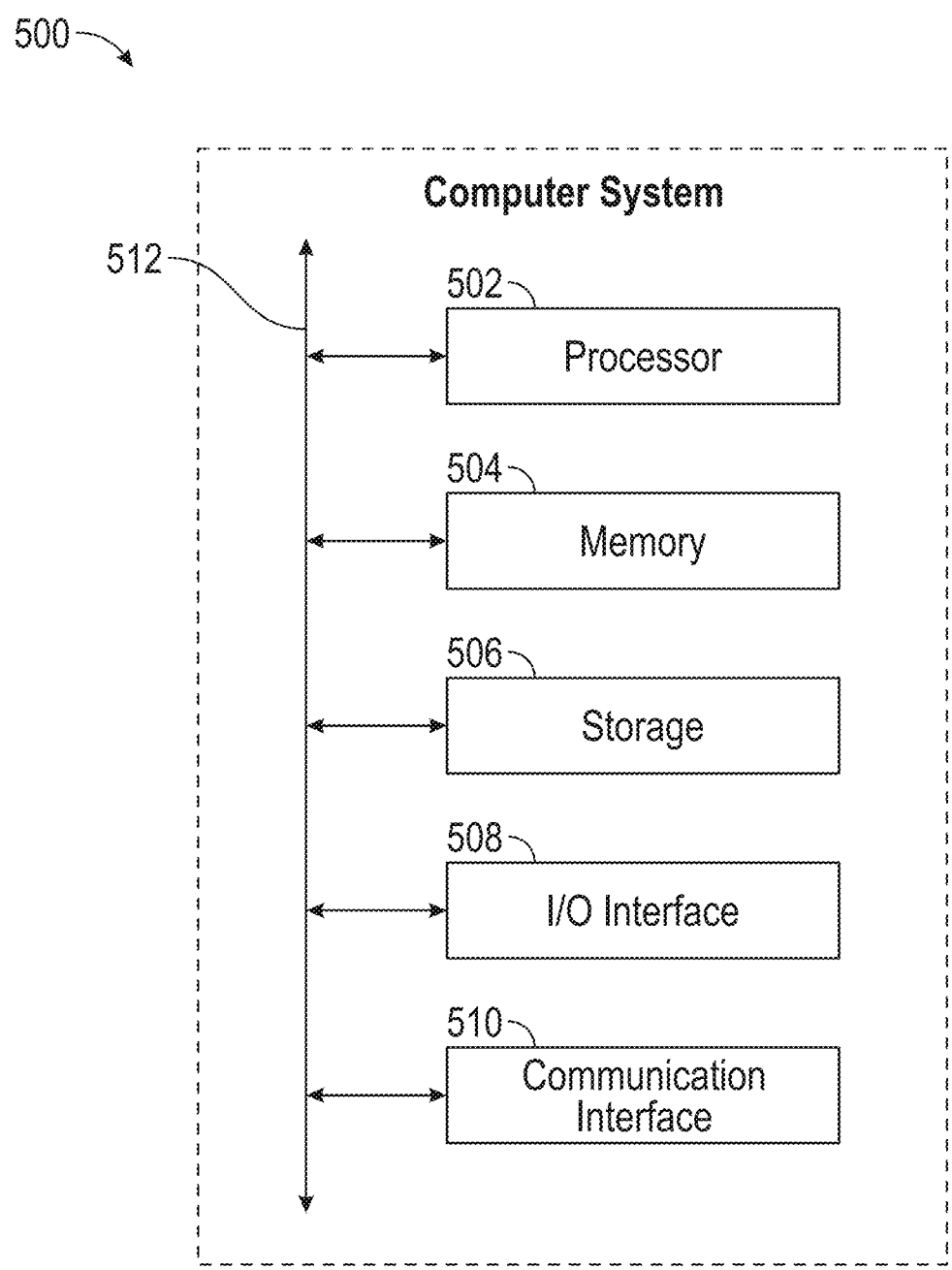
FIG. 5 illustrates an example computer system.

FIG. 5 illustrates an example computer system 500. In particular embodiments, one or more computer systems 500 perform one or more steps of one or more methods or operations described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

In some embodiments, a power cabinet for charging an electric vehicle comprises one or more of the computer system 500, and the one or more computer systems are configured to control the operation of the power cabinet. For example, the power controller 150 may comprise the computer system 500 for controlling the disclosed low loss power converter operations (e.g., determination of device switching times, determination of time of occurrences of events in the power converter 102, storage of parameters for determining device switching times). As another example, the voltage output circuit 100 may comprise the computer system 500 for controlling the disclosed low loss power converter operations and providing a desired output voltage (e.g., for charging the electric vehicle).

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions (e.g., determination of device switching times, determination of time of occurrences of events in the power converter 102), such as those making up a computer program. As an example and not by way of limitation, to execute instructions, processor 502 may retrieve (or fetch) the instructions from an internal register, an internal cache, memory 504, or storage 506; decode and execute them (e.g., storage of parameters for determining device switching times); and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes instructions in one or more internal registers or internal caches or in memory 504 (as opposed to storage 506 or elsewhere) and operates on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks (e.g., for controlling the disclosed power converter over a network, for receiving updated parameters for controlling the disclosed power converter). As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

In some embodiments, a method for providing a desired output voltage comprises: increasing a current through a first transistor; determining that the current reaches a value corresponding to the desired output voltage and, in response, turning off the first transistor; in response to turning off the first transistor, causing a drain-to-source voltage of a second transistor to become zero; determining that the drain-to-source voltage of the second transistor becomes zero and, in response, turning on the second transistor; and charging, via the second transistor, an output to the desired output voltage.

In some embodiments, the desired output voltage is an output voltage for charging an electric vehicle.

In some embodiments, the desired output voltage is between 200 volts and 1000 volts.

In some embodiments, charging the output comprises precharging an output capacitor.

In some embodiments, causing the drain-to-source voltage of the second transistor to become zero comprises charging or discharging an effective drain-to-source capacitance of the second transistor.

In some embodiments, when the current is increasing, the current does not flow past the output.

In some embodiments, the method further comprises: increasing a second current through the second transistor; determining the second current reaches a second value corresponding to the desired output voltage and, in response, turning off the second transistor; in response to turning off the second transistor, causing a drain-to-source voltage of the first transistor to become zero; determining that the drain-to-source voltage of the first transistor become zero and, in response, turning on the first transistor; and charging, via the first transistor, an output to the desired output voltage.

In some embodiments, the first current flows past a third transistor; the output is charged further via the third transistor; and the method further comprises: determining that the charging of the output is completed and, in response, turning off the third transistor; causing a drain-to-source voltage of a fourth transistor to become zero; and determining that the drain-to-source voltage of the fourth transistor becomes zero and, in response, turning on the fourth transistor.

In some embodiments, the method further comprises increasing a third current through the second and fourth transistors to reach a second value corresponding to the desired output voltage.

In some embodiments, the method further comprises, when the current is increased through the first transistor, charging a shim inductor.

In some embodiments, the method further comprises discharging the shim inductor, wherein a current for charging the output to the desired output voltage is induced by discharging the shim inductor.

In some embodiments, the current through the first transistor is provided by a secondary inductor; and a primary inductor induces the current provided by the secondary inductor.

In some embodiments, the method further comprises: causing a drain-to-source voltage of a fifth transistor to become zero; turning on the fifth transistor; and flowing, past the fifth transistor, a third current to the primary inductor to induce the current provided by the secondary inductor.

In some embodiments, the method further comprises determining that the current through the first transistor reaches the value corresponding to the desired output voltage at a first time, and the first time corresponds to a phase of the voltage across the secondary inductor.

In some embodiments, the value of the current corresponding to the desired output voltage is greater than a minimum current for causing the drain-to-source voltage of the second transistor to become zero.

In some embodiments, the method further comprises determining that the current through the first transistor reaches the value corresponding to the desired output voltage at a first time, and the first time is determined based on a result from performing a generalized harmonic approximation (GHA) method.

In some embodiments, the method further comprises storing the result from performing the GHA method.

In some embodiments, the method further comprises: receiving an indication to update the desired output voltage to a second desired output voltage; in response to receiving the indication to update the desired output voltage to the second desired output voltage, determining that the current reaches a value corresponding to the second desired output voltage.

In some embodiments, a voltage output circuit for providing a desired output voltage comprises: a power converter comprising a first transistor, a second transistor, and an output; and a power converter controller electrically coupled to the first transistor and the second transistor, wherein the power converter controller is configured to: cause a current through the first transistor to increase; determine that the current reaches a value corresponding to the desired output voltage and, in response, turn off the first transistor, wherein in response to turning off the first transistor, a drain-to-source voltage of a second transistor is caused to become zero; determine that the drain-to-source voltage of the second transistor becomes zero and, in response, turn on the second transistor, wherein turning on the second transistor causes the output to charge to the desired output voltage via the second transistor.

In some embodiments, a non-transitory computer-readable medium stores one or more instructions, which, when executed by one or more processors of an electronic device, cause the electronic device to perform a method comprising: increasing a current through a first transistor; determining that the current reaches a value corresponding to the desired output voltage and, in response, turning off the first transistor; in response to turning off the first transistor, causing a drain-to-source voltage of a second transistor to become zero; determining that the drain-to-source voltage of the second transistor becomes zero and, in response, turning on the second transistor; and charging, via the second transistor, an output to the desired output voltage.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method for providing a desired output voltage, comprising:
    increasing a current through a first transistor;
    determining that the current reaches a value corresponding to the desired output voltage and, in response, turning off the first transistor;
    in response to turning off the first transistor, causing a drain-to-source voltage of a second transistor to become zero;
    determining that the drain-to-source voltage of the second transistor becomes zero and in response, turning on the second transistor; and
    charging, via the second transistor, an output to the desired output voltage.

2. The method of claim 1, wherein the desired output voltage is an output voltage for charging an electric vehicle.

3. The method of claim 1, wherein the desired output voltage is between 200 volts and 1000 volts.

4. The method of claim 1, wherein charging the output comprises precharging an output capacitor.

5. The method of claim 1, wherein causing the drain-to-source voltage of the second transistor to become zero comprises charging or discharging an effective drain-to-source capacitance of the second transistor.

6. The method of claim 1, wherein, when the current is increasing, the current does not flow past the output.

7. The method of claim 1, further comprising:
    increasing a second current through the second transistor;
    determining that the second current reaches a second value corresponding to the desired output voltage and, in response, turning off the second transistor;
    in response to turning off the second transistor, causing a drain-to-source voltage of the first transistor to become zero;
    determining that the drain-to-source voltage of the first transistor becomes zero and, in response, turning on the first transistor; and
    charging, via the first transistor, an output to the desired output voltage.

8. The method of claim 1, wherein:
    the first current flows past a third transistor;
    the output is charged further via the third transistor; and
    the method further comprising:
        determining that the charging of the output is completed and in response, turning off the third transistor;
        causing a drain-to-source voltage of a fourth transistor to become zero; and
        determining that the drain-to-source voltage of the fourth transistor becomes zero and in response, turning on the fourth transistor.

9. The method of claim 8, further comprising increasing a third current through the second and fourth transistors to reach a second value corresponding to the desired output voltage.

10. The method of claim 1, further comprising, when the current is increased through the first transistor, charging a shim inductor.

11. The method of claim 10, further comprising discharging the shim inductor, wherein a current for charging the output to the desired output voltage is induced by discharging the shim inductor.

12. The method of claim 1, wherein:
    the current through the first transistor is provided by a secondary inductor; and
    a primary inductor induces the current provided by the secondary inductor.

13. The method of claim 12, further comprising:
    causing a drain-to-source voltage of a fifth transistor to become zero;
    turning on the fifth transistor; and
    flowing, past the fifth transistor, a third current to the primary inductor to induce the current provided by the secondary inductor.

14. The method of claim 12, further comprising determining that the current through the first transistor reaches the value corresponding to the desired output voltage at a first time, wherein the first time corresponds to a phase of the voltage across the secondary inductor.

15. The method of claim 1, wherein the value of the current corresponding to the desired output voltage is greater than a minimum current for causing the drain-to-source voltage of the second transistor to become zero.

16. The method of claim 1, further comprising determining that the current through the first transistor reaches the value corresponding to the desired output voltage at a first time, wherein the first time is determined based on a result from performing a generalized harmonic approximation (GHA) method.

17. The method of claim 16, further comprising storing the result from performing the GHA method.

18. The method of claim 1, further comprising:
receiving an indication to update the desired output voltage to a second desired output voltage;
in response to receiving the indication to update the desired output voltage to the second desired output voltage, determining that the current reaches a value corresponding to the second desired output voltage.

19. A voltage output circuit for providing a desired output voltage, comprising:
a power converter comprising a first transistor, a second transistor, and an output; and
a power converter controller electrically coupled to the first transistor and the second transistor, wherein the power converter controller is configured to:
cause a current through the first transistor to increase;
determine that the current reaches a value corresponding to the desired output voltage and in response, turn off the first transistor, wherein in response to turning off the first transistor, a drain-to-source voltage of a second transistor is caused to become zero; and
determine that the drain-to-source voltage of the second transistor becomes zero and, in response, turn on the second transistor, wherein turning on the second transistor causes the output to charge to the desired output voltage via the second transistor.

20. A non-transitory computer-readable medium storing one or more instructions, which, when executed by one or more processors of an electronic device, cause the electronic device to perform a method comprising:
increasing a current through a first transistor;
determining that the current reaches a value corresponding to a desired output voltage and in response, turning off the first transistor;
in response to turning off the first transistor, causing a drain-to-source voltage of a second transistor to become zero;
determining that the drain-to-source voltage of the second transistor becomes zero and, in response, turning on the second transistor; and
charging, via the second transistor, an output to the desired output voltage.

* * * * *